United States Patent [19]

Boulot

[11] Patent Number: 4,907,329

[45] Date of Patent: Mar. 13, 1990

[54] AXIAL SUPPORT DEVICE FOR A CYLINDER WITH ROTATING SLEEVE

[75] Inventor: Dominique Boulot, St Gratien, France

[73] Assignee: Clecim, Courbevoie, France

[21] Appl. No.: 202,867

[22] Filed: Jun. 6, 1988

[30] Foreign Application Priority Data

Jun. 4, 1987 [FR] France .................. 87 07823

[51] Int. Cl.$^4$ .............................. B21B 27/00
[52] U.S. Cl. .................. 29/116.2; 29/129.5; 72/245; 384/99
[58] Field of Search .................. 29/116.1, 116.2, 129.5; 72/245, 243, 247; 384/99, 563, 517, 518

[56] References Cited

U.S. PATENT DOCUMENTS

| | | | |
|---|---|---|---|
| 2,589,560 | 3/1952 | Lloyd | 384/563 |
| 2,631,072 | 3/1953 | Montgomery | 384/563 |
| 3,144,283 | 8/1964 | Ganet | 384/563 |
| 3,799,636 | 3/1974 | Kersting et al. | 384/563 |
| 3,943,803 | 3/1976 | Hafla | 384/563 |
| 4,399,747 | 8/1983 | Schiel et al. | 29/116.2 |
| 4,400,098 | 8/1983 | Lacey et al. | 384/99 |
| 4,626,111 | 12/1986 | Swasey et al. | 384/99 |
| 4,709,629 | 12/1987 | Appenzeller et al. | 29/116.2 |

*Primary Examiner*—Howard N. Goldberg
*Assistant Examiner*—Irene Cuda
*Attorney, Agent, or Firm*—Pollock, Vande Sande & Priddy

[57] ABSTRACT

An axial support device for a cylinder with rotating sleeve comprising a fixed shaft (2) carried at each end (20) by a support member (3) in a fixed frame (1), a tubular cylindrical sleeve (4) and a series of aligned holding shoes (22), for adjustment of the profile of the sleeve (4), which is equipped at each end with a centering bearing (6) comprising an outer ring (62) and an inner ring (61). Each centering bearing (6) forms an axial stop resting on the support member (3) by means of a floating support device exerting axial pressure uniformly distributed on the inner ring by following angular offsets of the bearing axis (60) relative to the axis (25) of the corresponding end (20) of the shaft (2) which result from the respective deformations of the sleeve and of the shaft due to stresses applied during operation. The invention is especially applicable to a support cylinder in a rolling mill.

7 Claims, 2 Drawing Sheets

AXIAL SUPPORT DEVICE FOR A CYLINDER WITH ROTATING SLEEVE

FIELD OF THE INVENTION

The subject of the invention is an axial support device for a roll with rotating sleeve of the type used for pressing or calendering flat products, particularly in the paper industry, but applies more especially to rolling installations for metal products subjected to considerable rolling stresses.

BACKGROUND OF THE INVENTION

For some time, the use has been proposed, firsly in the manufacture of paper and then, recently, in rolling mills, of rolls with a rotating sleeve comprising a fixed support shaft in the form of an extended beam, surrounded by a tubular sleeve mounted so as to rotate on the beam about bearings defining an axis of rotation transverse to the rolling axis, and resting on the beam by means of a plurality of support means distributed side by side along the length of the beam and centered on an axial support plane which corresponds to the plane of transmission of the rolling stress when the roll forms part of a rolling mill. In fact, the tubular sleeve, which has a relatively thin, is deformable, and, by acting selectively on the various support means, it is possible to give the external surface of the roll, for example in a rolling mill of a quarto or sexto type, a profile making it possible to compensate for the bending of the shaft and to correct defects in the surface evenness or thickness occurring on the product during rolling.

Rolls with rotating sleeves have long been known in the paper industry and, e.g., US-A-2,395,915 describes a roll of this type in which each support member consists of a part in the shape of a stirrup which rests on the inner surface of the sleeve by means of three rollers separated by about 120°, or a central roller located in the contact plane passing through the axis of the rolls and two lateral rollers resting on the guiding surfaces of the support shaft and parallel to the contact plane, respectively. In this manner, the tubular sleeve is held perfectly centred in the contact plane by the various support members distributed along its entire length.

However, such a system of centering by means of rollers does not allow the transmission of considerable stresses at high rotational speeds, and it is therefore preferred to embody the adjustment of the profile of the sleeve by means of support shoes centered in the contact plane and inserted between the shaft and the sleeve, each shoe resting, on the one hand, on the inner surface of the sleeve by means of a cylindrical support surface of substantially the same radius and, on the other hand, on the support shaft by means of an adjustable thrust means, generally a hydraulic jack, which allows individual adjustment of the thrust of each shoe in the radial direction so as to give the tubular sleeve the appropriate profile.

A hydraulic fluid is introduced continuously between the support surface of the shoe and the inner surface of the sleeve so as to form a lubricating film allowing the rotation of the sleeve resting on the shoes as described, for example, in US-A-3,131,625.

In these known arrangements, the centering of the sleeve on the shaft was provided by support members distributed along its entire length, and centering bearings are not provided at the ends of the sleeve.

However, the sleeve mounted in this way, floating on the ends of the shoes, tends to become deformed and to be moved transversely by the product itself when the latter is applied directly on the roll, or, alternatively, by the rotation of the adjacent roll in the case where, for example, the roll with rotating sleeve is the support roll of a rolling mill. The tubular sleeve is then preferably held at each end by centring bearings which are themselves held centered in the contact plane. Each bearing conventionally consists of an outer ring and an inner ring between which are inserted rollers or balls, the outter ring being fixed to the sleeve and the inner ring being centered in the contact plane by means of sliding guide members arranged on the support shaft.

For example, according to an arrangement provided for this purpose in FR-A-2,083,171, the inner ring of each bearing is equipped with guide surfaces which are mounted so as to slide along a corresponding flat surface arranged on the support shaft and parallel to the contact plane. In this manner, the tubular sleeve may be moved slightly with respect to the support shaft as a function of the stresses applied, but while remaining perfectly centered in the contact plane.

These known arrangements, which were provided for the paper industry, i.e., for relatively small stresses, are not immediately applicable to the metallurgical industry and, in partioular, to rolling mills in which the cylinder must transmit a very considerable rolling stress and, moreover, tends to be displaced parallel to the axis with respect to the support shaft under the influence of the stresses applied.

It is therefore necessary to provide axial support for the sleeve but to leave the latter free to position and deform itself independently of the shaft.

SUMMARY OF THE INVENTION

The object of the invention is to solve this problem, and the subject is therefore an axial support device for a roll with a rotating sleeve of the type comprising a fixed shaft in the form of an elongated beam carried at each end by a support member in a fixed frame, a tubular cylindrical sleeve slipped onto the shaft being mounted so as to rotate about an axis of rotation on a series of aligned holding shoes inserted between the shaft and the sleeve, and each associated with a thrust means for the adjustment of the profile of the sleeve, the latter being equipped at each end with a bearing for centering on the axis of rotation, comprising an outer ring which is solid in rotation with the sleeve and an inner ring locked in rotation.

According to the invention, each centering bearing is arranged so as to contain the axial thrusts, and rests axially on the support member by means of a floating support device which is capable of exerting an axial pressure which is uniformly distributed on the inner ring of the bearing by following the angular offsets of the axis of the bearing with respect to the axis of the corresponding end of the shaft which result from the respective deformations of the sleeve and of the shaft under the influence of stresses applied during operation.

According to a preferred feature of the invention, the floating support device of each bearing comprises a plurality of thrusters distributed regularly about the axis and mounted so as to slide parallel to the axis on a bush slipped onto the end of the shaft and consisting of a part of the support member, each thruster resting on the inner ring of the bearing with the possibility of axial displacement.

Each thruster advantageously consists of the piston of a hydraulic jack, the body of which is arranged inside the bush, the said jacks being connected to a common hydraulic circuit to keep them under pressure.

Preferably, the support device also comprises a friction ring inserted between the thrusters and the front surface of the inner ring of the bearing and housed advantageously in a housing arranged at the front end of the bush, with angular play allowing the ring to follow the offsets of the bearing with respect to the bush.

In this manner, it is possible to feed the jacks of the thrusters under sufficient pressure to allow the friction ring to be applied against the inner ring of the bearing, leaving it, however, a possibility of sliding which allows the radial positioning of the sleeve with respect to the fixed shaft, the pressure then being able to increase under the action of the axial stresses transmitted by the sleeve.

According to a particularly advantageous arrangement which may be used when the cylinder is applied to a rolling mill and must transmit a considerable stress, the inner ring of each bearing is locked in rotation with respect to the support member of the shaft by a single key centered in the contact plane and located on the side diametrally opposite the holding shoe, the latter covering an angular sector which is sufficient to provide centering of the sleeve with respect to the shaft on the opposite side.

BRIEF DESCRIPTION OF THE DRAWINGS

The invention will be better understood through the description which follows of a particular embodiment which is given by way of example and shown in the appended drawings.

DESCRIPTION OF PREFERRED EMBODIMENT

Figure 1:
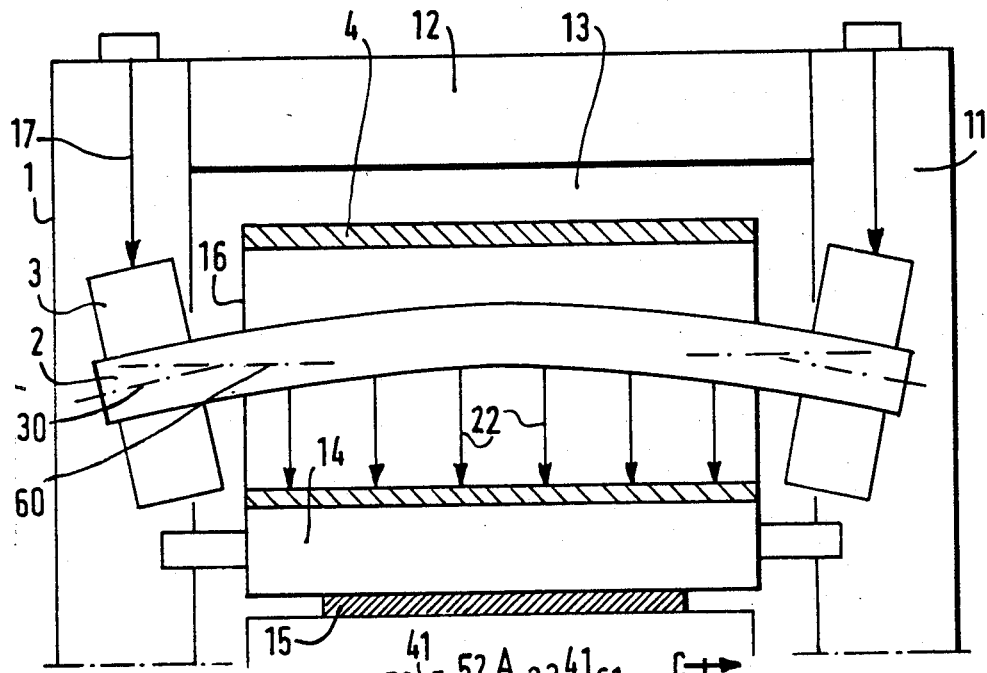
FIG. 1 is a diagrammatic view of the upper part of a rolling mill equipped with a cylinder with rotating sleeve.

FIG. 1 shows diagrammatically a rolling mill comprising a roll housing 1 consisting of two vertical columns 11 connected by a crosspiece 12 and defining a window 13 inside which is located the cylinder assembly, respectively the two working cylinders 14 between which the product 15 passes and the support cylinders 16 which frame them. At least one of these support cylinders consists of a cylinder with deformable sleeve comprising a fixed shaft 2 carried at each end by a support chock 3, housed in the corresponding column 11 of the rolling mill, on which chock is slipped a cylindrical sleeve 4 resting on the shaft by means of a plurality of holding members 22.

The rolling stress applied on a product 15 having a width which is less than the distance between the chocks 3 involves bending of the shaft 2 which is compensated for by adjusting the profile of the sleeve 4 by means of the holding members 22 so as to maintain the regularity of the pressure exerted on the width of the product 15.

At each end of the sleeve, this results in a certain angular offset between the axis 60 of the bearing 6 and the axis 30 of the chock.

Figure 2:
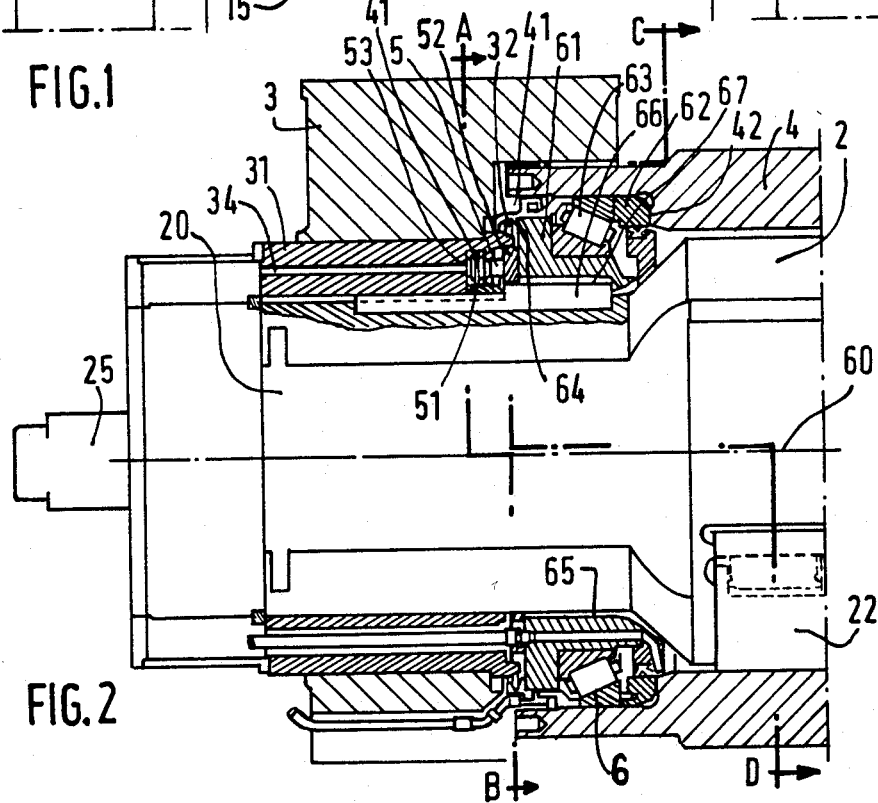
FIG. 2 represents, in axial section, the end of the cylinder and its support member.
Figure 3:
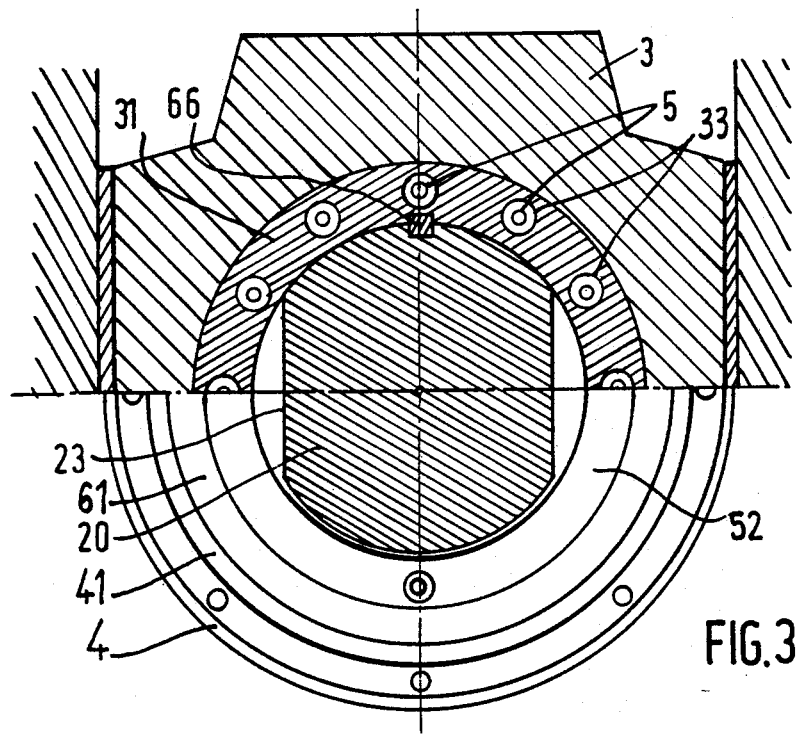
FIG. 3 is a half view in transverse section along the line A-B of FIG. 2.
Figure 4:
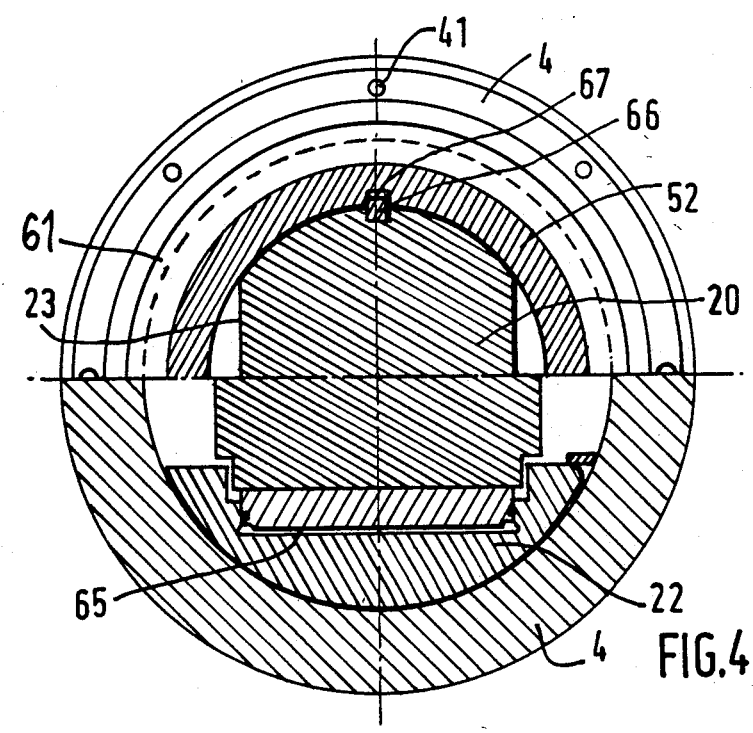
FIG. 4 is a half view in transverse section along the line C-D of FIG. 2.

As shown in greater detail in FIG. 2, each support chock 3 comprises a bush 31 in which the corresponding end 20 of the shaft 2 is slipped without play.

The tubular sleeve 4 is equipped at each end with a centering bearing 6 consisting of an inner ring 61 and an outer ring 62 between which are inserted conical rollers 63 in a manner such that, according to one of the features of the invention, the bearing 6 forms a stop which is capable of containing axial thrusts. To this end, the bearing 6 is housed in an inner recess 41 arranged at the end of the sleeve 4.

The bearing 6 is applied, by means of its inner ring 61, against the base 42 of the inner recess 41 by means of a plurality of thrusters 5 distributed regularly about the axis and housed in bores 33 arranged on the front surface 32 of the bush 31 opposite the bearing 6. Each thruster 5 is solid with a piston 51 sliding inside the bore 33 in a direction which is parallel to the axis, the assembly forming a small hydraulic jack, the chamber 53 of which is limited by the bore 33 and the piston 51. The chambers 53 of the various jacks are connected together by means of a circular channel (not shown) arranged in the bush 31, and the assembly may be placed under pressure before the start of operation by means of a channel 34 arranged in the bush and parallel to the axis.

A flat friction ring 52 is inserted between the thrusters 5 and the front surface 64 of the inner ring 61 of the bearing 6. The latter is slipped onto the end 20 of the shaft 2 with a play 65 allowing the sleeve 4 to be offset and to be deformed with respect to the shaft 2 under the action of the holding shoes 22.

The inner ring 61 of the bearing 6 must be locked in rotation, and this locking may be performed in a known manner, for example by means of one or more axles parallel to the contact plane, mounted on the end of the support shaft and sliding in corresponding bores arranged on the inner ring of the bearing, according to the arrangement of German Patent 1,146,022. However, in the embodiment shown in the drawings, it is preferred to leave the sleeve a certain freedom of positioning with respect to the other rolls by achieving the blocking in rotation by means of a single key 66 centered in the contact plane on the side opposite the holding shoes 22 and engaging in the corresponding aligned grooves arranged in the inner ring 61 of the bearing 6, in the friction ring 52, in the bush 31 and in the end 20 of the shaft 2.

In order to allow the sleeve 4 and its bearings 6 to be offset and deformed with respect to the shaft 2, a play 67 equal to the play 65 is arranged between the key 66 and the base of the groove of the inner ring 61.

The friction ring 52 is inserted in a housing arranged on the front surface of the bush 31 with a slight mechanical play allowing a certain angular offset of the axis of the bush 31 with respect to the axis of the friction ring 52 applied against the inner ring 61 by means of the thrusters 5, the latter being equipped with a rounded support surface.

As has been indicated above, the chambers 53 of the jacks of the thrusters 5 are connected together so as to form a closed circuit which, before the start of operation, is placed under a certain pressure by means of the feed channel 34, the latter then being closed so as to maintain the pressure. This pressure is simply sufficient to apply the friction ring 52 against the inner ring 61 without preventing the sliding of one part with respect to the other. In this manner, upon start of operation, the sleeve 4 centered on the holding shoes 22 may take a balanced position with respect to the shaft 2 under the action of the stress applied in the contact plane and of the various stresses.

During rolling, the assembly of the thrusters 5 fed under one and the same pressure and in a closed circuit forms a floating support, any displacement in one direction of the thrusters on one side of the axis being compensated for by an opposite displacement of the thrusters located on the opposite side by virtue of the free circulation of the oil. Any tendency of the sleeve 4 to be displaced axially one direction or in the other is prevented by the assembly of the thrusters of the bearing 6 located on the side opposite to the displacement, and is translated simply by an increase in pressure in the chambers of the jacks.

The axial stop device according to the invention therefore allows the sleeve to be positioned freely and deformed independently of the beam without introducing detrimental stresses which are capable of disturbing the adjustment of the profile of the sleeve.

The example represented, the bearings 6 are held in the contact plane by means of a single key, the centering of the sleeve being provided along its entire length by means of holding shoes which, to this end, cover a sufficient angular sector, of between 90° and 180°, of the inner wall of the sleeve. However, the bearings 6 could also be centered directly on the shaft by means of two keys or alternatively of guide surfaces parallel to the contact plane and capable of sliding on corresponding plane surfaces arranged on the ends 20 of the shaft 2.

The invention has been described in the context of a quarto type rolling mill but may also obviously be applied to other types of rolling mills or to other installations using rolls with rotating sleeves.

What is claimed is:

1. Axial support device for a roll with rotating sleeve, said device comprising
    (a) a fixed shaft (2) in the form of an elongated beam carried at each end (20) by a support member (3) in a fixed frame (1);
    (b) a tubular cylindrical sleeve (4) slipped onto said shaft (2) and mounted for rotation about an axis of rotation (60);
    (c) a series of aligned holding shoes (22) inserted between said shaft (2) and said sleeve (4) and each associated with a thrust means for adjustment of a profile of said sleeve (4);
    (d) a bearing (6) at each end of said sleeve for centering said sleeve on said shaft about said axis of rotation, each said bearing comprising an outer ring (62) which is solid in rotation with said sleeve (4) and an inner ring (61) locked in rotation;
    (e) each centering bearing (6) being arranged so as to contain axial thrusts and resting axially on said support member (3) by means of a floating support device which is capable of exerting uniformly distributed axial pressure on said inner ring (61) of said bearing (6) by following angular offsets of said axis of rotation (60) of the bearing (6) with respect to an axis (25) of a corresponding end (20) of said shaft (2), which offsets result from respective deformations of said sleeve and of said shaft under the influence of stresses applied during operation;
    (f) said floating support device of each bearing (6) comprising a plurality of thrusters (5) distributed regularly about said axis (25) of a corresponding end of said shaft and mounted for sliding movement parallel to said axis inside a bush (31) slipped onto said end (20) of said shaft (2) and forming a part of said support member (3), each thruster (5) resting on said inner ring (61) of said bearing (6) with a possibility of axial displacement parallel to said axis of said corresponding end of said shaft, said thrusters being hydraulically actuated under a same common pressure.

2. Axial support device according to claim 1, wherein each thruster (5) forms the piston (51) of a hydraulic jack (53) having a body which is arranged inside said bush (31), said jacks (53) being connected to a common hydraulic circuit which is closed and kept under pressure.

3. Axial support device according to claim 1, wherein said support device comprises a friction ring (52) inserted between said thrusters (5) and a front surface (64) of said inner ring (61) of said bearing (6).

4. Axial support device according to claim 3, wherein said friction ring (52) is slipped without transverse play into a housing arranged at a front end of said bush (31) with a possibility for pivoting allowing said ring (52) to follow angular offsets of said bearing (6) with respect to said bush (31).

5. Axial support device according to claim 3, wherein said jacks (53) of said thrusters (5) are kept under pressure sufficient to allow said friction ring (52) to be applied against said inner ring (61) of said bearing without preventing sliding of one on the other for positioning said sleeve (4) with respect to said shaft (2) under the influence of applied stresses.

6. Axial support device according to any one of claims 1 to 5, wherein said inner ring (61) of each bearing (6) has an inner surface provided with parallel guide surfaces mounted so as to slide along corresponding plane surfaces (23) at the end (20) of said shaft (2) and parallel to a plane of transmission of rolling stresses applied to said roll.

7. Axial support device according to any one of claims 1 to 5, applied to a rolling mill cylinder for transmission of rolling stress along a contact plane passing through an axis of said rolls and in which said holding shoes (22) are substantially centered, wherein said inner ring (61) of each bearing (6) is locked in rotation with respect to said support member (3) of said shaft (2) by a single key (66) centered in said contact plane located on a side diametrally opposite said holding shoe (22), said holding shoe covering an angular surface which is sufficient to center said sleeve with respect to said shaft on a side opposite said key.

* * * * *